United States Patent
Fromentoux et al.

(10) Patent No.: US 12,185,102 B2
(45) Date of Patent: Dec. 31, 2024

(54) ACCESS METHOD AND METHOD FOR CONTROLLING ACCESS OF A NODE TO A NETWORK ON THE BASIS OF A TEST

(71) Applicant: ORANGE, Issy-les-Moulineaux (FR)

(72) Inventors: Gael Fromentoux, Chatillon (FR); Frederic Fieau, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 529 days.

(21) Appl. No.: 16/958,316

(22) PCT Filed: Dec. 20, 2018

(86) PCT No.: PCT/FR2018/053453
§ 371 (c)(1),
(2) Date: Jun. 26, 2020

(87) PCT Pub. No.: WO2019/129960
PCT Pub. Date: Jul. 4, 2019

(65) Prior Publication Data
US 2021/0067962 A1    Mar. 4, 2021

(30) Foreign Application Priority Data
Dec. 28, 2017  (FR) ...................................... 1763329

(51) Int. Cl.
*H04W 12/06* (2021.01)
*H04W 12/08* (2021.01)
(Continued)

(52) U.S. Cl.
CPC .......... *H04W 12/06* (2013.01); *H04W 12/08* (2013.01); *H04W 24/02* (2013.01); *H04W 24/06* (2013.01)

(58) Field of Classification Search
CPC ..... H04W 12/06; H04W 12/08; H04W 24/02; H04W 24/06
See application file for complete search history.

(56) References Cited

U.S. PATENT DOCUMENTS

| 7,370,350 B1 * | 5/2008 | Salowey | G06F 21/445 |
| | | | 713/168 |
| 7,395,311 B2 * | 7/2008 | Kaler | H04L 63/0869 |
| | | | 709/203 |

(Continued)

OTHER PUBLICATIONS

English translation of the Written Opinion of the International Searching Authority dated Apr. 1, 2019 for corresponding International Application No. PCT/FR2018/053453, filed Dec. 20, 2018.

(Continued)

*Primary Examiner* — Kambiz Zand
*Assistant Examiner* — Afaq Ali
(74) *Attorney, Agent, or Firm* — David D. Brush; Westman, Champlin & Koehler, P.A.

(57) ABSTRACT

Devices and methods for accessing and for controlling access of a node, called "challenged node", that has already been authenticated and is provisionally connected to a network of nodes, the network including at least one node, called "challenging node". The method for controlling access, implemented by a challenging node, includes: defining a personalized test that must be executed by the challenged node; sending the test to the challenged node; receiving, from the challenged node, at least one result of the execution of the test; and authorizing or refusing the access of the challenged node to the network, at least on the basis of the result.

9 Claims, 4 Drawing Sheets

(51) Int. Cl.
*H04W 24/02* (2009.01)
*H04W 24/06* (2009.01)

(56) References Cited

U.S. PATENT DOCUMENTS

| | | | | |
|---|---|---|---|---|
| 7,877,596 B2* | 1/2011 | Foo Kune | ............. | H04L 63/145 713/168 |
| 8,627,416 B2* | 1/2014 | Keeler | ................ | H04L 63/0869 713/168 |
| 10,419,931 B1* | 9/2019 | Sohail et al. | ........ | H04L 63/1425 |
| 11,184,766 B1* | 11/2021 | Lord | ..................... | H04L 63/107 |
| 2005/0138178 A1* | 6/2005 | Astarabadi | ........ | H04W 36/0085 709/227 |
| 2005/0198489 A1* | 9/2005 | Wallace | ................... | G06F 21/33 712/201 |
| 2006/0026481 A1* | 2/2006 | Monnerat | .......... | G01R 31/2825 348/E17.005 |
| 2006/0046710 A1* | 3/2006 | Lohlein | ................. | H04W 12/35 455/423 |
| 2006/0089122 A1* | 4/2006 | Zavalkovsky | ........ | H04W 48/02 455/410 |
| 2008/0247317 A1* | 10/2008 | Weil | ......................... | H04L 43/50 370/237 |
| 2010/0045780 A1 | 2/2010 | Kwon et al. | | |
| 2011/0014933 A1* | 1/2011 | Karmarkar | .............. | H04W 4/02 455/466 |
| 2011/0045780 A1 | 2/2011 | Ben Hadj Alaya et al. | | |
| 2011/0221568 A1* | 9/2011 | Giobbi | .................. | H04W 12/06 340/5.82 |
| 2012/0198279 A1* | 8/2012 | Schroeder | ........... | G06F 11/2294 714/E11.177 |
| 2013/0294252 A1* | 11/2013 | Olgaard | .................. | H04L 43/12 370/241 |
| 2014/0057596 A1* | 2/2014 | Brill | ....................... | H04L 63/126 455/410 |
| 2016/0249176 A1* | 8/2016 | Pearce | .................. | H04L 63/123 |
| 2016/0373944 A1* | 12/2016 | Jain | .......................... | H04L 65/80 |
| 2018/0167218 A1* | 6/2018 | Walrant | .............. | H04L 63/0876 |
| 2018/0206136 A1* | 7/2018 | Chow | ..................... | H04L 43/50 |
| 2019/0258805 A1* | 8/2019 | Elovici | ................. | G06F 11/261 |

OTHER PUBLICATIONS

International Search Report dated Mar. 22, 2019 for corresponding International Application No. PCT/FR2018/053453, filed Dec. 20, 2018.

Written Opinion of the International Searching Authority dated Mar. 22, 2019 for corresponding International Application No. PCT/FR2018/053453, filed Dec. 20, 2018.

French Search Report dated Oct. 1, 2018 for corresponding French Application No. 1763329, filed Dec. 28, 2017.

* cited by examiner

ACCESS METHOD AND METHOD FOR CONTROLLING ACCESS OF A NODE TO A NETWORK ON THE BASIS OF A TEST

CROSS-REFERENCE TO RELATED APPLICATIONS

This Application is a Section 371 National Stage Application of International Application No. PCT/FR2018/053453, filed Dec. 20, 2018, which is incorporated by reference in its entirety and published as WO 2019/129960 A1 on Jul. 4, 2019, not in English.

BACKGROUND OF THE INVENTION

The invention relates to the general field of telecommunications.

It relates more particularly to the access of a new node to a network including one or several node(s).

In methods known in the state of the art, when a new node wishes to join a network, it sends a request for access to the network and joins the network after having been authenticated.

According to such a method, the node having joined the network may have insufficient technical characteristics, for example in terms of computation capacity, computation deadline or data transmission and then degrades the characteristics of the network.

The invention relates to an access control method which avoids or limits these drawbacks.

OBJECT AND SUMMARY OF THE INVENTION

The invention thus relates to a method for controlling access of a node called "challenged node" to a network including one or several node(s), the challenged node having already been authenticated and being provisionally connected to said network, the method being implemented by at least one node of said network, called "challenging node", and comprising the steps of:
    defining a test to be executed by the challenged node, the test being customized for the challenged node;
    sending the test to the challenged node;
    receiving, from the challenged node, at least one result of the execution of the test; and
    authorizing or denying access of the challenged node to the network at least on the basis of this result.

Correlatively, the invention relates to a method for access of a node called "challenged node" to a network including one or several node(s), the challenged node having already been authenticated and being provisionally connected to said network, the method being implemented by the challenged node and comprising the steps of:
    receiving a test from a node of the network called "challenging node";
    executing the test and obtaining at least one result of the execution of the test; and
    sending this result to the challenging node.

The invention thus allows the selection of the nodes of a network based on a customized test for each new node wishing to join the network. The challenging node denies the access of the challenged node to the network unless it considers that the result of this customized test, executed by the challenged node, is satisfactory. The connection of the challenged node to the network remains temporary until a challenging node validates or rejects the access of the challenged node to the network.

The tests can be defined so as to guarantee an overall quality of execution of tasks in the network. The invention particularly makes it possible to achieve a common goal in the nodes of the network, such as a computation capacity or accuracy, the compliance with a latency requirement or a reduction in the energy consumption.

The access control method and the access method can proceed automatically without human intervention.

Correlatively, the invention relates to a node called "challenging node" comprised in a network including one or several node(s), the challenging node being able to control an access to the network of a node, called "challenged node" having already been authenticated and being provisionally connected to the network, the challenging node comprising:
    a module for defining a test to be executed by the challenged node, the test being customized for the challenged node;
    a module for sending the test to the challenged node;
    a module for receiving, from the challenged node, at least one result of the execution of the test; and
    a module for authorizing or denying the access of the challenged node to the network at least from this result.

Correlatively, the invention relates to a node called "challenged node" having already been authenticated and being provisionally connected to a network including one or several node(s), the challenged node comprising:
    a module for receiving a test from a node of the network called "challenging node";
    a module for executing the test and obtaining at least one result of the execution of the test; and
    a module for sending this result to the challenging node.

According to the invention, the challenged or challenging nodes are able to integrate a computer network or a telecommunications network. Each of these nodes can be a terminal, a user equipment such as a telephone, a tablet, a computer or a connected object or an intermediate node of a network such as an antenna, a switch, a router, a computing center or another device.

In one particular embodiment of the invention, the access control method comprises a step of verifying an ability of the challenging node to define the test to be executed by the challenged node.

In this embodiment, not only the challenged nodes are tested, but also the challenging nodes which define the customized tests for the challenged nodes.

In one particular embodiment of the access control method according to the invention, the verification of an ability of the challenging node to define the test to be executed by the challenged node is carried out as a function of at least one parameter among:
    a distance between the challenging node and the challenged node; and
    an indicator of performance of a connection channel established between the challenging node and the challenged node.

The distance between the challenging nodes and the challenged node can for example be a topological distance corresponding to a number of hops between these nodes, or a geographical distance (expressed in meters or kilometers) and determined from a geographical location of these nodes.

Thus, the characteristics of the communication channel established between the challenged node and the challenging node do not affect the decision to authorize or deny the access of the challenged node to the network. Only the challenging nodes which offer acceptable connection qualities are able to define the test to be executed by the challenged node.

In one particular embodiment of the access control method according to the invention, the definition of a customized test to be executed by the challenged node is carried out as a function of at least a weight, a height or a depth of the challenged node.

According to the invention, the weight of a node corresponds to the number of terminals connected to this node weighted by the quality of the offered connection, for example, a number of validated transactions that the node will have carried out.

According to the invention, the height of a node corresponds to the topological distance, in other words to the number of hops, between this node and the first node of the network having joined the network.

For example, the number of node hops between two nodes connected directly to each other is equal to 1. The number of node hops between two nodes connected via a single intermediate node is equal to 2.

According to the invention, the depth of a node corresponds to its distance in number of node hops relative to the last nodes of the network having joined the network.

In one embodiment, the distance in number of nodes is weighted by a constraint of the network such as the average latency of a transmission on the network, the energy consumption of the network, a piece of information relating to a throughput of a radio-electric link, etc. This weighting coefficient can be comprised in an MTG (Mobile Throughput Guidance) field of the TCP protocol as defined by the IETF (Internet Engineering Task Force).

To illustrate the weight, height and depth parameters of a node, the following table presents the composition of a network with three consecutive states t0, t1 and t2. Initially, the network includes two nodes A and B. Four terminals are connected to the node A and 6 terminals are connected to the node B. The weights of the node A and of the node B are respectively 4 and 6. The nodes A and B are the nodes which allowed the creation of the network, their height is equal to 1. They are the only nodes of the network in the state t0, therefore their depth is also equal to 1.

| | State | | | | | | | | |
|---|---|---|---|---|---|---|---|---|---|
| | t0 | | t1 | | | t2 | | | |
| | | | | node | | | | | |
| | A | B | A | B | C | A | B | C | D |
| weight | 4 | 6 | 4 | 6 | 3 | 4 | 6 | 3 | 5 |
| height | 1 | 1 | 1 | 1 | 2 | 1 | 1 | 2 | 3 |
| width | 1 | 1 | 2 | 2 | 1 | 3 | 3 | 2 | 1 |

In state t1, a node C joins the network, its height is equal to 2 since it is connected directly to at least one of the nodes A or B, and its depth is equal to 1 since it is the new node of the network. The depth of the nodes A and B changes to 2.

In state t2, a node D joins the network through a connection to the node C. The depth of the new node D is equal to 1. This node D is not in direct connection neither with node A nor with node B, a hop through node C is necessary, therefore the height of the node D is equal to 3. The depth of node C changes to 2 and the depth of the nodes A and B changes to 3.

The invention thus allows customization of the test to be defined for a challenged node according to its characteristics relating to its geographical, logical and temporal position in the network.

In one particular embodiment of the access control method according to the invention, the authorization or denial of access of the challenged node to the network, by a challenging node, also takes into account the result of the execution of another test by this same challenged node, this other test having been sent to the challenged node by another challenging node of the network.

In this embodiment, the access of the challenged node to the network takes into account the result of several tests submitted by different challenging nodes. This embodiment makes it possible to implement a consensus decision process, each of the challenging nodes being able to submit a customized test to the challenged node in order to test an ability of this challenged node of particular interest for this challenging node. During a decision taken consensually by several challenging nodes, the voice of each of these nodes can be accompanied by a weight: this is then called weighted consensus.

The invention makes it possible to take into account several varied criteria for the definition of a test. The defined test will be then adapted to the needs of the nodes of the network and to the expectations of the network regarding the new nodes.

In one particular embodiment of the access control method according to the invention, following the step of authorizing or denying the access, the challenging node sends data to at least another node of the network, the data being representative of:
- the permanent connection of the challenged node to the network; or
- the update of a topology of the network; or
- the update of a sharing of tasks in the network; or
- the disconnection of the challenged node from the network.

The invention thus makes it possible to update the architecture and the topology of the network, which allows a better operating efficiency of the network. In addition, the sharing of tasks and the communications between the various nodes of the network are optimized.

In one particular embodiment of the access control method or of the access method according to the invention, the test is characterized by at least a computation capacity, an execution period, a memory capacity and an energy consumption of the challenged node.

The invention thus makes it possible to obtain, from the test result(s), information on the technical characteristics of a challenged node wishing to join the network, such as its computation capacity, its storage capacity, its task execution deadline and its energy consumption.

The invention also relates to a computer program on a recording medium, this program being likely to be implemented in a node of the network, called "challenging node" allowing controlling access of a node called "challenged node" to the network, or more generally in a computer, this program including instructions adapted to the implementation of the steps of a method for controlling access of the challenged node to the network as described above.

The invention also relates to a computer program on a recording medium, this program being likely to be implemented in a node called "challenged node" allowing access to a network, or more generally in a computer, this program including instructions adapted to the implementation of the steps of a method for access of the challenged node to the network as described above.

Each of these programs can use any programming language, and be in the form of source code, object code or intermediate code between source code and object code, such as in a partially compiled form, or in any other desirable form.

The invention also relates to information or recording media readable by a computer, and including instructions for the computer programs as mentioned above.

The information or recording media can be any entity or device capable of storing the program. For example, the media may include a storage means, such as a ROM, for example a CD ROM or a microelectronic circuit ROM, or a magnetic recording means, for example a floppy disc or a hard disc.

On the other hand, the information or recording media can be transmissible media such as an electrical or optical signal, which can be routed via an electrical or optical cable, by radio link, by wireless optical link or by other ways. The programs according to the invention can be particularly downloaded over an Internet-type network.

Alternatively, each information or recording medium can be an integrated circuit in which the program is incorporated, the circuit being adapted to execute or to be used in the execution of the method in question.

It can also be envisaged, in other embodiments, that the access control method, or the access method, or the challenging node, or the challenged node presents in combination all or part of the characteristics above.

BRIEF DESCRIPTION OF THE DRAWINGS

Other characteristics and advantages of the present invention will emerge from the description given below, with reference to the appended drawings which illustrate an exemplary embodiment thereof devoid of any limiting character. In the figures.

DETAILED DESCRIPTION OF THE INVENTION

The invention relates to two methods, namely:
a method for controlling access to a network, implemented by a node of the network called "challenging node"; and
a method for access to the network implemented by a node, called "challenged node", which wishes to join the network.

Communications are established between the challenging node and the challenged node.

The invention applies to a network of one or several node(s). When a challenged node joins the network, it can be thereafter considered as a "child" node vis-à-vis the challenging node of the network which authorizes it to permanently join the network. This challenging node is thereafter considered as the "parent" node of the challenged node authorized to join the network permanently.

The child node can in turn control the access of a new node to the network. It then becomes the parent node of this last new node if it authorizes this node to join the network permanently.

Detailed Description of a Method for Controlling Access to a Network

Figures 1, 2:
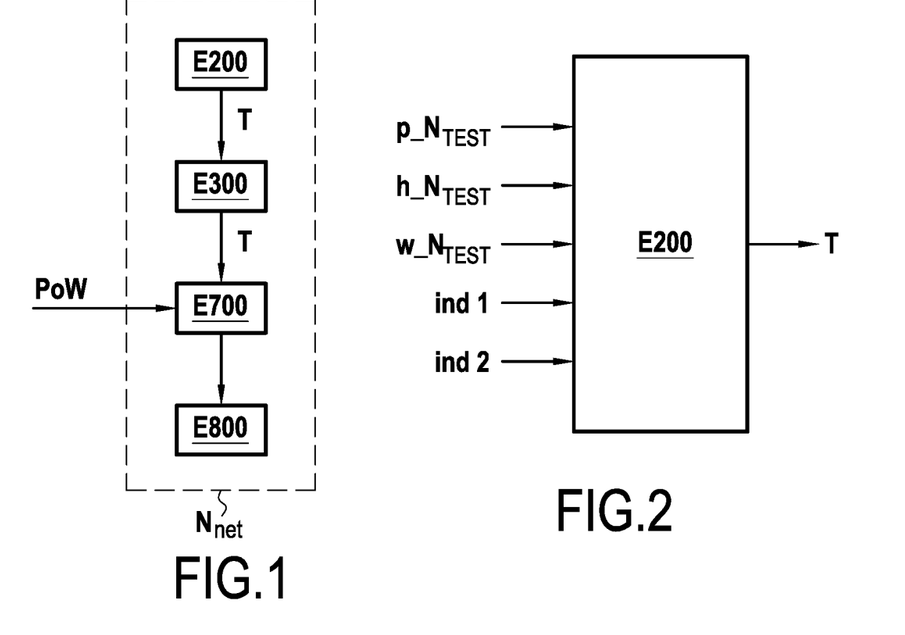
FIG. 1 is a flowchart representing the main steps of a method for controlling access of a challenged node to a network by a challenging node according to one embodiment of the invention.
FIG. 2 represents the inputs-output of a step of defining a test according to one embodiment of the invention.

FIG. 1 illustrates the different steps of the method for controlling access of a challenged node $N_{TEST}$ to a network including one or several node(s), according to the invention. It is considered that the challenged node $N_{TEST}$ has already been authenticated and that it is provisionally connected to the network. The method is implemented by at least one node of the network, called "challenging node" $N_{net}$.

Optional steps preliminary to the invention will be described first. These steps relate to the detection of the presence of the challenged node and its authentication.

In one embodiment, the challenged node may have been detected by terminals or user equipment. In this case, the detection may have been carried out by a crowd-sourcing method.

In another embodiment, it is the challenged node itself that sends messages, for example of the "hello" type, to the nodes of the network to request the access to the network. The communication protocol used by the nodes to communicate together can be arbitrary. It can be particularly a standardized protocol, for example the SIP protocol, or the HTTP protocol, or a proprietary protocol.

In another embodiment, at least one node of the network detects the presence of the challenged node, for example via a transactional method for extending a distributed network or via a DLEP (Dynamic Link Exchange Protocol) protocol.

Other methods for detecting the presence of a challenged node are possible.

After having been detected, an authentication phase is established between the challenged node and at least one node of the network, generally the neighboring node to the challenged node. A neighboring node can be defined as being a node of the accessible network and within the range of the challenged node, or the node of the network which offers the best quality of connection to the challenged network. The connection between the challenged node and a neighboring node of the challenged node is established directly without passing through an intermediate node.

In case of success of the authentication phase, the challenged node is provisionally connected to the network. During this provisional or temporary admission, the challenged node does not necessarily have information on the topology of the network. Only the information allowing its connection to at least one node of the network is necessary.

The challenged node $N_{TEST}$ having already been authenticated and being provisionally connected to the network, the steps of the access control method will be described below according to one embodiment of the invention.

The access control method according to the invention includes a step E200 of defining a test T to be executed by the challenged node $N_{TEST}$, the test T being customized for the challenged node $N_{TEST}$. During this step E200, the challenging node $N_{net}$ may possibly define several tests to be executed by the challenged node $N_{TEST}$.

FIG. 2 illustrates the inputs-output of the step E200 of defining a customized test. These inputs can be performance indicators Ind1, Ind2, a weight w_$N_{TEST}$ of the challenged node, a height h_$N_{TEST}$ and/or a depth p_$N_{TEST}$. Step E200 returns the defined test T.

In one particular embodiment of the invention, the weight w_$N_{TEST}$ of a challenged node corresponds to a throughput on a link established between the challenging node and the challenged node $N_{TEST}$. This throughput parameter can for example be comprised in a MTG (Mobile Throughput Guidance) field of the TCP protocol as defined by the IETF (Internet Engineering Task Force). It can also be determined by an explicit measurement of the RTT by use of the "spin bit" when the nodes communicate by the QUIC protocol.

The definition of a customized test T to be executed by the challenged node $N_{TEST}$ in step E200 can depend on a parameter or a combination of parameters such as the weight w_$N_{TEST}$, the height h_$N_{TEST}$ and the depth p_$N_{TEST}$ of the challenged node. It can also depend on one or several other parameter(s) (Ind1, Ind2).

In one embodiment of the invention, the definition of a customized test T for a challenged node $N_{TEST}$ depends on the number of nodes or terminals or user equipment having detected the presence of this challenged node $N_{TEST}$.

The customized test T, which must be executed by the challenged node $N_{TEST}$, can comprise one or several computation task(s) or data or signal processing task(s), or one or several cryptographic operation(s). The test T can comprise network characteristics and/or service characteristics. The test T can present constraints on the test execution time and/or on the form of presentation of the result of the test execution and/or on the order of accuracy of the result of the test execution.

In step E300, the challenging node $N_{net}$ sends the test T to the challenged node $N_{TEST}$. The test is sent via the network, since the challenged node $N_{TEST}$ is already authenticated and provisionally connected to the network, particularly to the challenging node $N_{net}$.

In one embodiment, the challenging node $N_{net}$ sends the test T to the challenged node $N_{TEST}$ and also data required for the execution of the test T. For example, the challenging node $N_{net}$ sends its public key and the test T to the challenged node $N_{TEST}$, the test T being a cryptographic operation which requires this key for its execution.

In step E700, the challenging node $N_{net}$ receives from the challenged node $N_{TEST}$ at least one PoW result of the test T. this PoW (Proof of Work) result can be a simple notification of the rejection of the test T or a result of the execution of the test T. The PoW result is received via the network.

From this PoW result, the challenging node makes the decision, in step E800, to deny or authorize the access of the challenged node $N_{TEST}$ to the network beyond the temporary access.

In one embodiment, the decision to authorize or deny the access of the challenged node $N_{TEST}$ to the network is made according to a threshold. This amounts to verifying, for example, whether the challenged node $N_{TEST}$ was able to achieve a threshold percentage of tasks comprised in the test T, or whether the challenged node $N_{TEST}$ was able to send the PoW result within a predefined threshold deadline, or whether the PoW result has better accuracy than threshold accuracy.

In some embodiments of the invention, the challenging node $N_{net}$ can send multiple tests to the challenged node $N_{TEST}$. The challenging node $N_{net}$ can then receive in step E700 several PoW results of execution of the tests. From these PoW results, the challenging node $N_{net}$ obtains in step E800 a decision to authorize or deny the access of the challenged node $N_{TEST}$ to the network. The decision can be weighted according to the PoW results, or take into account only one predefined number of PoW results.

In some embodiments of the invention, several challenging nodes $N_{net}$ can send their tests to the challenged node $N_{TEST}$. A challenging node $N_{net}$ can communicate with other third-party nodes, in step E800, to make a collective decision to authorize or deny the access of the challenged node $N_{TEST}$ to the network, from the PoW results of the execution of the various tests T. These other third-party nodes can also be challenging nodes $N_{net}$ vis-à-vis the challenged node or parent nodes of challenging nodes.

If a challenging node $N_{net}$ does not receive a PoW result of execution of the test T from the challenged node $N_{TEST}$ within a predefined deadline, the access of the challenged node $N_{TEST}$ will be denied.

In one embodiment of the invention, the method for controlling access of a challenged node to the network comprises a step E100, which is executed before the step E200 of defining the test. Step E100 is a step of verifying an ability of the challenging node $N_{net}$, which implements the method, to define the customized test T to be executed by the challenged node $N_{TEST}$.

This ability can be expressed as a function of the distance in number of nodes, as defined above, between the challenging node and the challenged node, weighted or not with respect to a constraint. The ability can also be expressed as a function of an indicator of performance of a connection channel established between the challenging node and the challenged node such as a CSI (Channel State Information), CQI (Channel Quality Indicator), SNR (Signal to Noise Ratio), SNIR (Signal to Noise and Interference Ratio) or SNDR (Signal to Noise plus Distortion Ratio) type indicator or as a function of an indicator relating to the transmission latency or power on this channel. The ability of the challenging node to define the customized test T can be determined as a function of an indicator on the traffic circulating in the network such as a TSI (Traffic State Information) type indicator or an indicator relating to service classes such as a QCI (QoS Class Indicator) type indicator.

Step E100 of verifying the ability of the challenging node $N_{net}$ to define the test T can be carried out as a function of Boolean variables relating to the challenging node $N_{net}$ and/or to the challenged node $N_{TEST}$ such as:

the nature of a node, for example a router, a computing center or an antenna,
the hardware technical characteristics of a node, for example a routing latency, a computation capacity or a signal emission power,
the logical or functional characteristics of a node, for example a signature or a provider,
the number of users connected to a node, or other parameters.

In one embodiment of the invention, following the step E800 of authorizing or denying the access, the challenging node sends data to at least another node of the network.

In case of authorization of access of the challenged node $N_{TEST}$ to the network, the challenging node $N_{net}$ can send data to the challenged node $N_{TEST}$ and/or to the other nodes of the network so that the provisional admission of the connection of the challenged node $N_{TEST}$ to the network becomes permanent. The challenged node $N_{TEST}$ therefore becomes a node of the network and is considered to be the child node according to the invention of the challenging node $N_{net}$. In this case, the challenging node $N_{net}$ can send to some nodes or broadcast data relating to a new management of resources or programming of tasks in the network.

In case of denial of access of the challenged node $N_{TEST}$ to the network, the challenging node $N_{net}$ can send data to the challenged node $N_{TEST}$ and/or to the other nodes of the network so that the provisional connection of the challenged node $N_{TEST}$ to the network is terminated. In one embodiment, the challenging node $N_{net}$ disconnects the challenged node without notification thereto.

Figure 3:
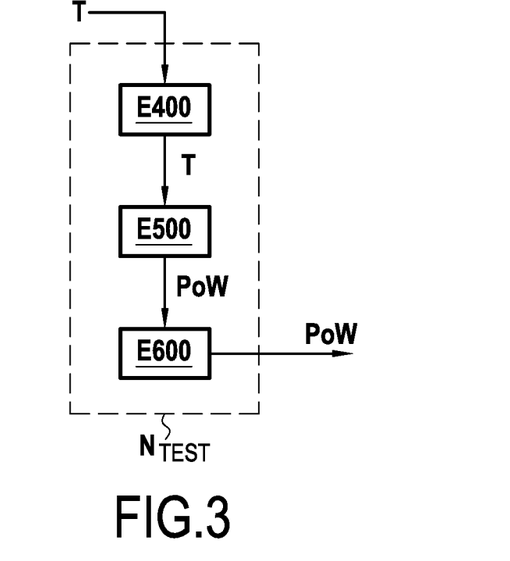
FIG. 3 is a flowchart representing the main steps of a method for access of a challenged node to a network according to one embodiment of the invention.

Detailed Description of a Method for Accessing to a Network According to the Invention FIG. 3 illustrates the steps of the method for access of a node called "challenged node" $N_{TEST}$ to a network including one or several node(s), according to the invention. It is considered that the challenged node $N_{TEST}$ has already been authenticated and that it is provisionally connected to said network. The method for access of a challenged node to the network is implemented by the challenged node $N_{TEST}$.

In step E400, the challenged node $N_{TEST}$ receives a test T from a node of the network, called "challenging node" $N_{net}$. This test corresponds to the customized test defined by the challenging node $N_{net}$ according to the access control method described above.

In step E500, the challenged node $N_{TEST}$ executes the test T and then obtains one or several PoW result(s) of the execution of the test T.

The challenged node $N_{TEST}$ sends in step E600 this or these PoW result(s) to the challenging node $N_{net}$.

Receiving the test T and sending at least one PoW result are done via the network.

In one embodiment of the invention, after receiving a test T in step E400, the challenged node $N_{TEST}$ can decide to deny the execution of the test T. In this case, it sends in step E600 a notification of its denial as a PoW result. Alternatively, it does not respond to this invitation to execute the test T.

Indeed, the challenged node $N_{TEST}$ can estimate that it is not able to execute the test T. The challenged node $N_{TEST}$ can also make measurements, from information obtained from the received test T, to evaluate the resources and the time required for the execution of the test T and to compare them with its own test execution means.

The challenged node $N_{TEST}$ may also be able to execute the test T but decides to deny the execution of the test T. Consequently, the access of the challenged node $N_{TEST}$ to the network will be denied.

In one embodiment, a test T according to the invention, defined and sent by a challenging node $N_{net}$ to a challenged node $N_{TEST}$, is characterized by at least a computation capacity, an execution period, a memory capacity and an energy consumption of the challenged node.

Figure 4:
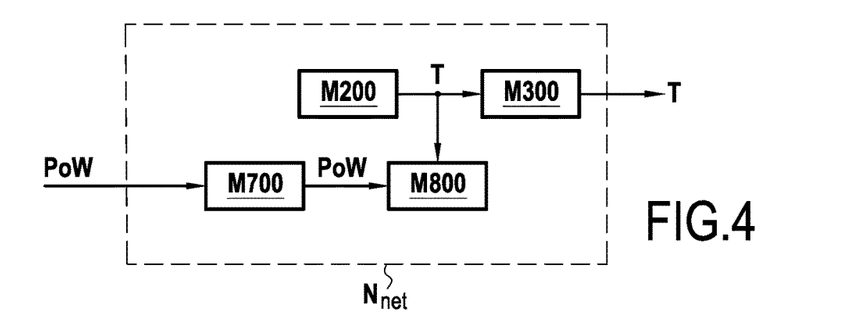
FIG. 4 presents a functional architecture of a challenging node according to one embodiment of the invention.

FIG. 4 presents a functional architecture of a node called "challenging node" $N_{net}$ comprised in a network including one or several node(s), the challenging node $N_{net}$ being able to control access to the network of a node called "challenged node" $N_{TEST}$ having already been authenticated and being provisionally connected to said network.

The challenging node $N_{net}$ comprises:
 a module M200 for defining a test T to be executed by the challenged node $N_{TEST}$, the test T being customized for the challenged node $N_{TEST}$;
 a module M300 for sending the test T to the challenged node $N_{TEST}$;
 a module M700 for receiving, from the challenged node $N_{TEST}$, at least one PoW result of the execution of the test T; and a module M800 for authorizing or denying the access of the challenged node $N_{TEST}$ to the network at least from the PoW result.

The challenging node $N_{net}$ also comprises an authentication module, not represented, which allows it to manage its communication with other nodes.

Figure 5:
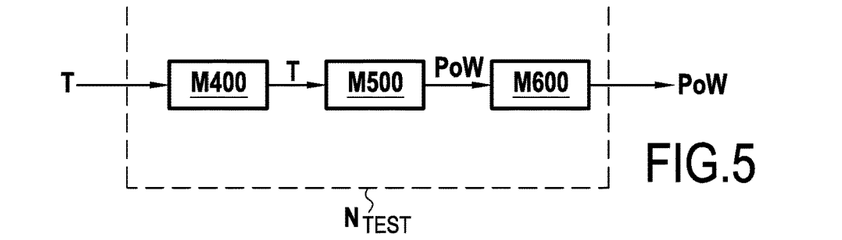
FIG. 5 presents a functional architecture of a challenged node according to one embodiment of the invention.

FIG. 5 presents a functional architecture of a node called "challenged node" $N_{TEST}$. The challenged node $N_{TEST}$ comprises:
 a module M400 for receiving a test T from a node of the network called "challenging node" $N_{net}$;
 a module M500 for executing the test T and obtaining at least one PoW result of the execution of the test T; and
 a module M600 for sending the at least one PoW result to the challenging node $N_{net}$.

The challenged node $N_{TEST}$ also comprises an authentication module, not represented, which allows it to manage its communication with other nodes.

Figure 6:
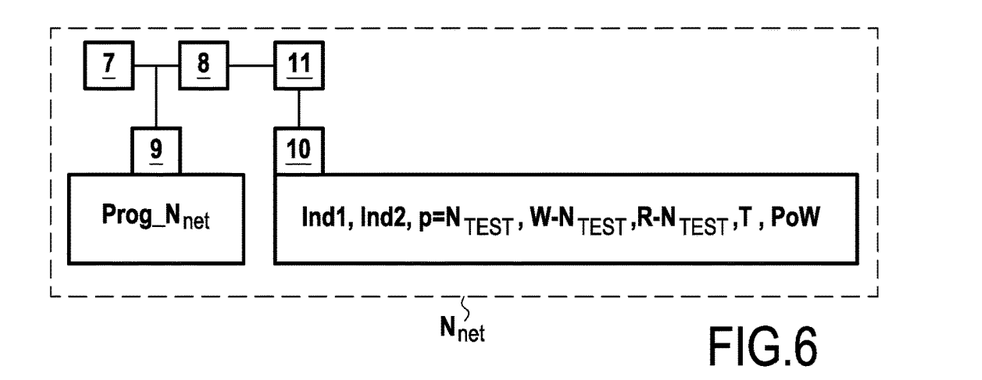
FIG. 6 illustrates the hardware architecture of a challenging node according to one embodiment of the invention.

In this embodiment, the challenging node $N_{net}$ has the architecture of a computer, as illustrated in FIG. 6. It comprises in particular a processor 7, a random-access memory 8, a read-only memory 9, a non-volatile flash memory 10 in one particular embodiment of the invention, as well as communication means 11. Such means are known per se and are not described in more detail here.

The read-only memory 9 of the challenging node $N_{net}$ controlling the access of a challenged node $N_{TEST}$ to the network, according to the present invention constitutes a recording medium according to the invention, readable by the processor 7 and on which a computer program Prog-$N_{net}$ is recorded here according to the invention. The memory 10 of the challenging node $N_{net}$ allows recording variables used for the execution of the steps of the access control method according to the invention, such as the parameters w_$N_{TEST}$, h_$N_{TEST}$, p_$N_{TEST}$, Ind1, Ind2 according to which the challenging node defines the test T, the test T or the received PoW result(s).

The computer program Prog-$N_{net}$ defines functional and software modules here, configured for the control of access of a challenged node $N_{TEST}$ to the network. These functional modules are based on and/or control the hardware elements 7-11 of the challenging node $N_{net}$ mentioned previously.

Figure 7:
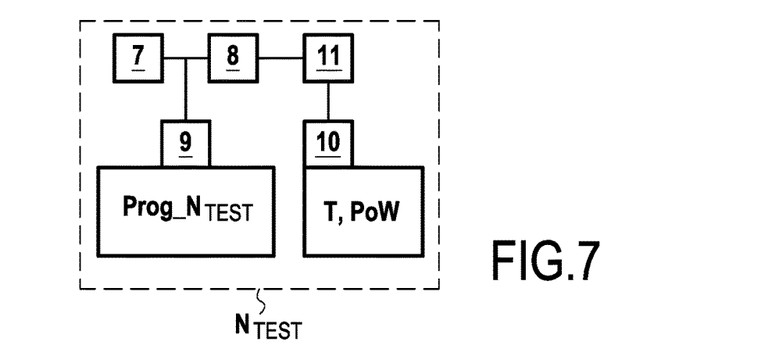
FIG. 7 illustrates the hardware architecture of a challenged node according to one embodiment of the invention.

In this embodiment, the challenged node $N_{TEST}$ has the architecture of a computer, as illustrated in FIG. 7. It comprises in particular a processor 7, a random-access memory 8, a read-only memory 9, a non-volatile flash memory 10 in one particular embodiment of the invention, as well as communication means 11. Such means are known per se and are not described in more detail here.

The read-only memory 9 of the challenged node $N_{TEST}$ requesting the access to the network, according to the present invention constitutes a recording medium according to the invention, readable by the processor 7 and on which a computer program Prog-$N_{TEST}$ is recorded here according to the invention. The memory 10 of the challenged node $N_{TEST}$ allows recording variables used for the execution of the steps of the access method according to the invention, such as the received test T and the obtained PoW result(s).

The computer program Prog-$N_{TEST}$ defines functional and software modules here, configured for the access of the challenged node $N_{TEST}$ to the network. These functional modules are based on and/or control the hardware elements 7-11 of the challenged node $N_{TEST}$ mentioned above.

Thereafter, an example of application of the invention in a cellular network initially formed by a group of nodes will be described. This group of nodes has a common objective such as the densification of a mobile network in a given geographical area or the improvement of the energy efficiency. This group often called Fog constitutes a network topology which will be for example established in the form of a direct acyclic graph DAG, according to a combination of local parameters such as the geographical location of each node and/or technical parameters such as the interferences between the different nodes.

Figure 8:
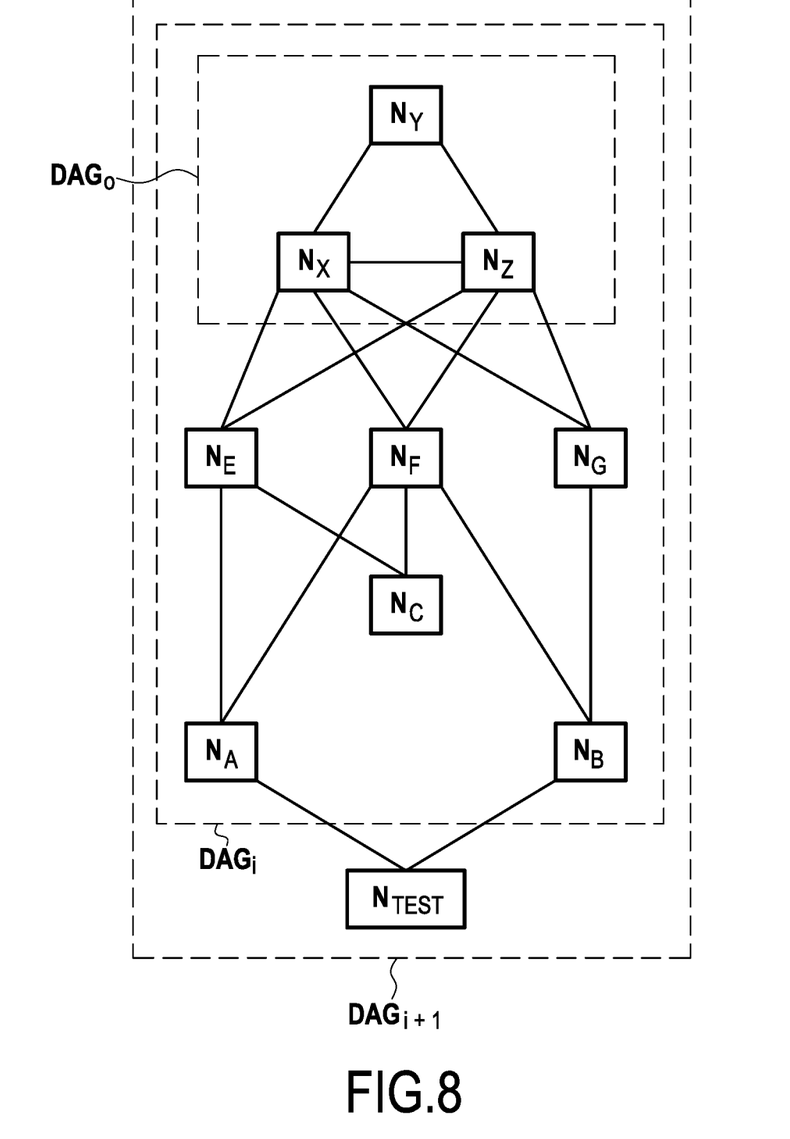
FIG. 8 illustrates a DAG topology of a network according to one example of application of the invention.

FIG. 8 illustrates a topology of a network in the form of DAG according to this example of application of the invention. The group of the nodes $N_Y$, $N_X$ and $N_Z$ creating the network is denoted DAG0. In this example, the nodes are femto-cell type antennas, which can be denoted HeNB (Home evolved Node B).

Each new node wishing to join the network DAG0 is provided with parameters such as its weight w, its height h and its depth p. These parameters have been described previously. At an instant i, the network has a topology denoted DAGi, including the nodes $N_Y$, $N_X$ and $N_Z$ of the DAG0 and nodes $N_E$, $N_F$, $N_G$, $N_A$, $N_B$ and $N_C$ having joined the network subsequently on a permanent basis.

In a topology in the form of DAG, each new node wishing to join the network must be admitted by at least two nodes of the network, which will be subsequently, in case of admission, its parent nodes. The node $N_C$ for example has as parents the nodes $N_E$ and $N_F$.

In this example, the node $N_{TEST}$ already authenticated and provisionally connected to the network wishes to join the network. Each node of the network is characterized by the distance which separates it from the node $N_{TEST}$ and by the emitting and receiving powers on a communication channel established between it and the node $N_{TEST}$ if it exists.

For the application of the invention to this example of topology, the new node $N_{TEST}$ will be challenged by at least two nodes of the network, which are in this example the nodes $N_A$ and $N_B$, the closest to the node $N_{TEST}$.

Figure 9:
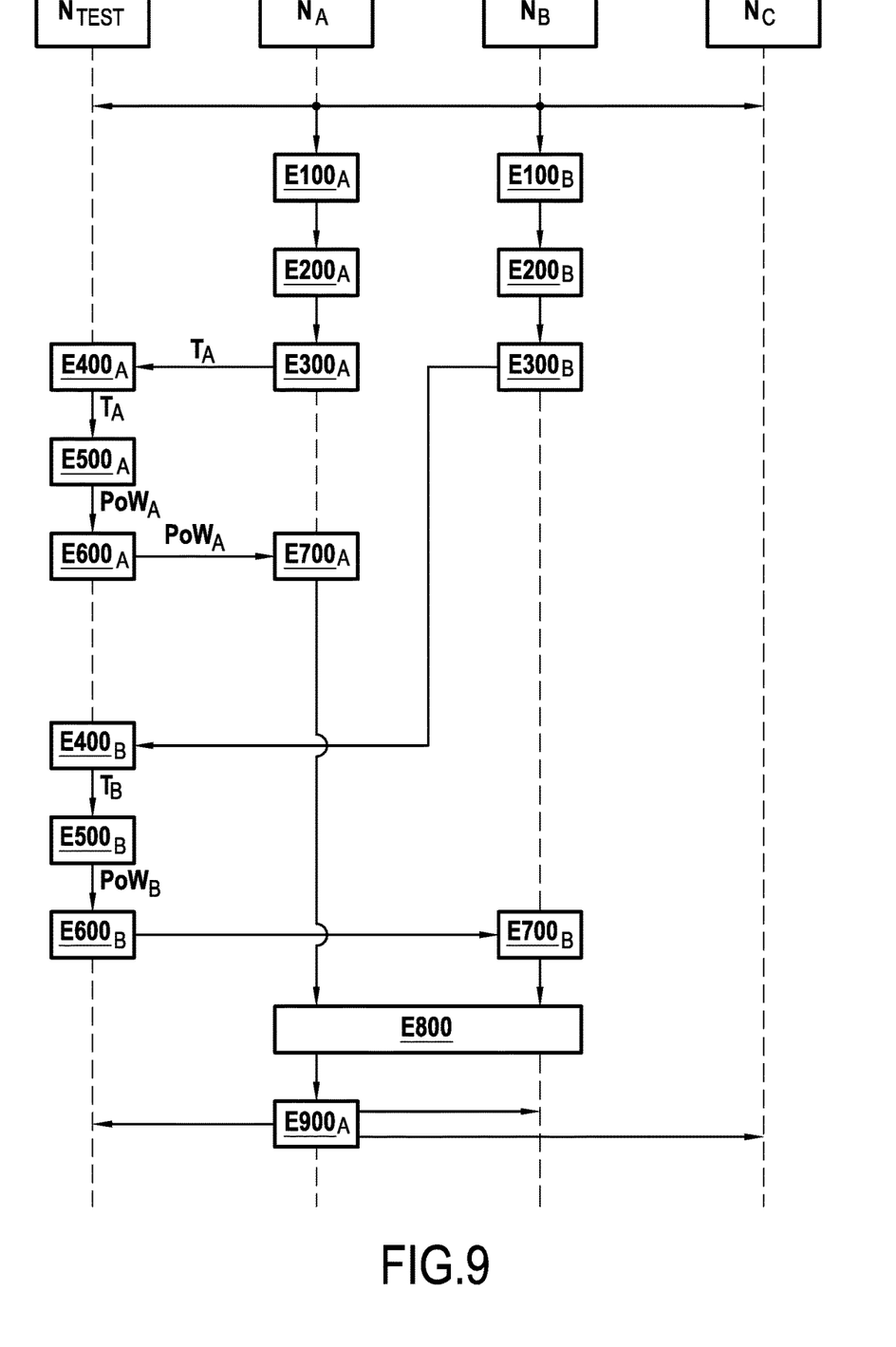
FIG. 9 is a flowchart representing the main steps of one example of application of the invention.

FIG. 9 is a flowchart representing the main steps of this example of application of the invention in this network having a topology in the form of DAG.

Each of the challenging nodes $N_A$ and $N_B$ verifies during a step $E100_A$ and respectively $E100_B$, whether or not it is able to define a test T to be executed by the challenged node $N_{TEST}$. Each of the nodes $N_A$ and $N_B$ considers boolean variables for the verification, these boolean variables can be obtained from the parent nodes of the nodes $N_A$ or $N_B$. The Boolean variables can also relate to the challenging node $N_A$ or $N_B$ and/or to the challenged node $N_{TEST}$.

In this example, the verifications in steps $E100_A$ and $E100_B$ allow determining that the challenging nodes $N_A$ and $N_B$ are able to define tests T. Consequently, each of these nodes $N_A$ and $N_B$ defines, during a step $E200_A$ or respectively $E200_B$, a customized test $T_A$ or respectively $T_B$ to be executed by the challenged node $N_{TEST}$. The difficulty of the test $T_A$ or $T_B$ is proportional to several criteria such as the force of the signal, in other words the throughput between the challenging node defining the test and the challenged node $N_{TEST}$, characteristics such as the location of the challenged node or of a challenging node, the load of the challenged node or of a challenging node, information relating to link throughputs towards the challenged node or of the challenged node, etc.

Each test $T_A$ or $T_B$ is characterized by at least a computation capacity, an execution period, a memory capacity and an energy consumption of the challenged node $N_{TEST}$.

As an example, the tests $T_A$ and $T_B$ are 256-bit hash type cryptographic operations SHA-256 (Secure Hash Algorithm).

During steps $E300_A$ and $E300_B$, the challenging nodes $N_A$ and $N_B$ send their respective tests $T_A$ and $T_B$ to the challenged node $N_{TEST}$, which receives them in steps $E400_A$ and $E400_B$. The challenged node $N_{TEST}$ executes in a step $E500_A$, respectively $E500_B$, the test $T_A$, respectively $T_B$, and thus obtains at least one $PoW_A$, respectively $PoW_B$, result. In this example of SHA-256 type tests $T_A$ and $T_B$, the challenged node $N_{TEST}$ uses in steps $E300_A$ and $E300_B$ the public keys of $N_A$ and $N_B$ as well as the secret key of the challenged node $N_{TEST}$ to be able to obtain the $PoW_A$ and $PoW_B$ results. The $PoW_A$ or $PoW_B$ result can be for example of the form 0000ab9c7ed.

The challenged node $N_{TEST}$ sends in a step $E600_A$ the $PoW_A$ result to the challenging node $N_A$ which receives it in a step $E700_A$. Similarly, the challenged node $N_{TEST}$ sends in a step $E600_B$ the $PoW_B$ result to the challenging node $N_B$ which receives it in a step $E700_B$.

During a step $E800$ common to the two challenging nodes $N_A$ and $N_B$, these nodes $N_A$ and $N_B$ decide whether or not they admit the access of the challenged node $N_{TEST}$ to the network. The challenging nodes $N_A$ and $N_B$ can verify characteristics of the $PoW_A$ and $PoW_B$ results such as the size (in bits) of each result or the form of each result.

If none of the results of the tests $T_A$ and $T_B$ is satisfactory, the challenged node $N_{TEST}$ will be disconnected from the network and not referenced in the DAG topology.

If at least one $PoW_A$ or $PoW_B$ result is satisfactory, but not both of them, each of the nodes $N_A$ and $N_B$ can report the $PoW_A$ or $PoW_B$ result to at least one of its two parent nodes. According to the construction of a topology in the form of a DAG graph, these two nodes have at least one common parent node. The common parent node makes the decision to authorize or deny the access of the challenged node $N_{TEST}$ to the network.

If all the results of the execution of the tests $T_A$ and $T_B$ are satisfactory, the challenged node $N_{TEST}$ will be definitively connected to the network and will therefore be referenced in the DAG topology. In this case, the node $N_{TEST}$ will be considered as the child node of the two nodes $N_A$ and $N_B$.

In a step $E900_A$, the challenging node $N_A$ is responsible for the update of the DAG topology. It sends information messages to the challenged node $N_{TEST}$ for the admission of its access and permanent connection to the network and information messages for the other nodes of the network $N_B$ and $N_C$ for the update of their knowledge of the network topology, for example for the update of their routing tables.

Characteristics of the new node of the network $N_{TEST}$, such as its weight $w\_N_{TEST}$, its height $h\_N_{TEST}$ and its depth $p\_N_{TEST}$, can be shared between the different nodes of the network. The heights and depths of some nodes of the network can be modified following the authorization of access of the node $N_{TEST}$.

In another example of application of the invention, each of the challenging nodes $N_A$ and $N_B$ sends messages of update of the network topology.

The invention claimed is:

1. A method comprising:
controlling access of a node called "challenged node" to a network including one or several node(s), the challenged node being already authenticated and being provisionally connected to said network, the controlling being implemented by at least one node of said network, called "challenging node", and comprising:
defining a test to be executed by said challenged node, said test being customized for said challenged node and testing at least a computation capacity, an execution period, a memory capacity and an energy consumption of the challenged node;

sending the test to the challenged node;

receiving, from said challenged node, at least one test result of an execution of the test;

obtaining, from said at least one test result, information on technical characteristics of the challenged node wishing to join the network, said information comprising at least one of the computation capacity, or the storage capacity, or the energy consumption of said challenged node or an execution deadline of a task by said challenged node;

authorizing or denying access of the challenged node to the network at least on the basis of the information on technical characteristics of the challenged node; and verifying an ability of said challenging node to define the test to be executed by said challenged node, wherein the verification of an ability of said challenging node to define the test is carried out as a function of at least one parameter among:

a distance between the challenging node and the challenged node; and an indicator of performance of a connection channel established between the challenging node and the challenged node.

2. The method according to claim 1 wherein the definition of the test is carried out as a function of at least a weight, a height or a depth of said challenged node.

3. The method according to claim 1 wherein the authorization or denial of access of the challenged node to the network also takes in account a result of execution of another test by said challenged node, this other test having been sent to the challenged node by another challenging node of said network.

4. The method according to claim 1 wherein following the authorizing or denying the access, the challenging node sends data to at least another node of the network, said data being representative of:

a permanent connection of the challenged node to the network; or an update of a topology of the network; or an update of a sharing of tasks in the network; or a disconnection of the challenged node from the network.

5. A method comprising:

accessing a network by challenged node, the network including one or several node(s), the challenged node being already authenticated and being provisionally connected to said network, the accessing comprising:

receiving a test from a node of the network called "challenging node", the test including a test of at least a computation capacity, an execution period, a memory capacity and an energy consumption of the challenged node;

executing said test and obtaining at least one test result of the execution of the test; and sending said at least one test result to said challenging node for authorizing or denying access of the challenged node to the network at least based on the at least one test result, wherein the at least one test result includes data representative of:

a permanent connection of the challenged node to the network; or an update of a topology of the network; or an update of a sharing of tasks in the network; or a disconnection of the challenged node from the network.

6. A node called "challenging node" comprised in a network including one or several node(s), the challenging node being able to control an access to said network of a node, called "challenged node", the challenged node being already authenticated and being provisionally connected to said network, the challenging node comprising:

a processor; and a non-transitory computer-readable medium comprising instructions stored thereon which when executed by a processor or the challenging node configure the challenging node to:

define a test to be executed by said challenged node, said test being customized for said challenged node and testing at least a computation capacity, an execution period, a memory capacity and an energy consumption of the challenged node;

send the test to the challenged node;

receive, from said challenged node, at least one test result of an execution of the test;

obtain, from said at least one test result, information on technical characteristics of the challenged node wishing to join the network, said information comprising at least one of the computation capacity, or the storage capacity, or the energy consumption of said challenged node or an execution deadline of a task by said challenged node;

authorize or deny the access of the challenged node to the network at least from the information on technical characteristics of the challenged node; and verify an ability of said challenging node to define the test to be executed by said challenged node, wherein the verification of an ability of said challenging node to define the test is carried out as a function of at least one parameter among:

a distance between the challenging node and the challenged node; and an indicator of performance of a connection channel established between the challenging node and the challenged node.

7. A node called "challenged node", the challenged node comprising:

a processor; and a non-transitory computer-readable medium comprising instructions stored thereon which when executed by a processor of the challenged node configure the challenged node, being already authenticated and being provisionally connected to said network, to:

receive a test from a node of the network called "challenging node", the test including a test of at least a computation capacity, an execution period, a memory capacity and an energy consumption of the challenged node;

execute said test and obtain at least one test result of the execution of the test; and send said at least one test result to said challenging node for authorizing or denying access of the challenged node to the network at least based on the at least one test result, wherein the at least one test result includes data representative of:

a permanent connection of the challenged node to the network; or an update of a topology of the network; or an update of a sharing of tasks in the network; or a disconnection of the challenged node from the network.

8. A non-transitory computer-readable data medium having stored thereon instructions which, when executed by a processor, cause the processor to perform a method for controlling access of a node called "challenged node" to a network including one or several node(s), the challenged node being already authenticated and being provisionally connected to said network, the method being implemented by at least one node of said network, called "challenging node", and comprising:
- defining a test to be executed by said challenged node, said test being customized for said challenged node and testing at least a computation capacity, an execution period, a memory capacity and an energy consumption of the challenged node;
- sending the test to the challenged node;
- receiving, from said challenged node, at least one test result of an execution of the test;
- obtaining, from said at least one test result, information on technical characteristics of the challenged node wishing to join the network, said information comprising at least one of the computation capacity, or the storage capacity, or the energy consumption of said challenged node or an execution deadline of a task by said challenged node;
- authorizing or denying access of the challenged node to the network at least on the basis of the information on technical characteristics of the challenged node; and
- verifying an ability of said challenging node to define the test to be executed by said challenged node,
- wherein the verification of an ability of said challenging node to define the test is carried out as a function of at least one parameter among:
  - a distance between the challenging node and the challenged node; and
  - an indicator of performance of a connection channel established between the challenging node and the challenged node.

9. A non-transitory computer-readable data medium having stored thereon instructions which, when executed by a processor, cause the processor to perform a method for access of a node called "challenged node" to a network including one or several node(s), the challenged node being already authenticated and being provisionally connected to said network, the method being implemented by said challenged node and comprising:
- receiving a test from a node of the network called "challenging node", the test including a test of at least a computation capacity, an execution period, a memory capacity and an energy consumption of the challenged node;
- executing said test and obtaining at least one test result of the execution of the test; and
- sending said at least one test result to said challenging node for authorizing or denying access of the challenged node to the network at least based on the at least one test result,
- wherein the at least one test result includes data representative of:
  - a permanent connection of the challenged node to the network; or
  - an update of a topology of the network; or
  - an update of a sharing of tasks in the network; or
  - a disconnection of the challenged node from the network.

* * * * *